United States Patent [19]

Silva

[11] Patent Number: 4,500,548

[45] Date of Patent: Feb. 19, 1985

[54] FERMENTATION AID FOR CONVENTIONAL BAKED GOODS

[75] Inventor: Roy F. Silva, Norwalk, Conn.

[73] Assignee: Stauffer Chemical Company, Westport, Conn.

[21] Appl. No.: 358,407

[22] Filed: Mar. 15, 1982

[51] Int. Cl.$^3$ .......................... A21D 2/22; A21D 8/02
[52] U.S. Cl. ........................................ 426/19; 426/24; 426/27; 426/62; 426/653
[58] Field of Search ............... 426/19, 20, 24, 27, 426/62, 471, 555, 496, 653

[56] References Cited

U.S. PATENT DOCUMENTS

| | | | |
|---|---|---|---|
| 1,293,772 | 2/1919 | Heudebert . | |
| 1,922,096 | 8/1933 | Jung | 99/10 |
| 2,023,500 | 12/1935 | Wagerbauer | 99/10 |
| 2,152,593 | 3/1939 | Jung | 99/90 |
| 2,174,807 | 10/1939 | Swartout | 426/19 |
| 2,546,250 | 3/1951 | Baker | 426/62 |
| 2,808,334 | 10/1957 | Battiste | 426/19 |
| 3,031,306 | 4/1962 | Freed | 99/90 |
| 3,066,029 | 11/1962 | Jeffreys | 426/19 |
| 3,102,033 | 8/1963 | Jackel | 99/90 |
| 3,354,049 | 11/1947 | Christensen | 195/100 |
| 3,394,013 | 7/1968 | Dirks | 99/118 |
| 3,410,692 | 11/1968 | Wutzel | 99/90 |
| 3,429,712 | 2/1969 | Turner | 426/19 |
| 3,435,641 | 12/1969 | Bundus | 99/140 |
| 3,438,786 | 4/1969 | Wutzel | 99/90 |
| 3,466,174 | 9/1969 | Bundus | 99/90 |
| 3,466,176 | 9/1969 | Bundus | 99/140 |
| 3,466,177 | 9/1969 | Bundus et al. | 426/19 |
| 3,490,916 | 1/1970 | Henika | 426/19 |
| 3,615,695 | 10/1971 | Luksas | 99/140 |
| 3,615,696 | 10/1971 | Sjostrom | 99/140 |
| 3,615,697 | 10/1971 | Hollenbeck | 99/140 |
| 3,677,887 | 7/1972 | Jeffrey | 195/55 |
| 3,681,083 | 8/1972 | Everson | 99/90 |
| 3,713,844 | 1/1973 | Sternberg | 426/19 |
| 3,734,743 | 5/1973 | Kline | 99/90 |
| 3,833,737 | 9/1974 | Siegel | 426/27 |
| 3,894,155 | 7/1975 | Ono | 426/25 |
| 3,897,307 | 7/1975 | Porubcan | 185/59 |
| 3,959,494 | 5/1976 | Starkie | 426/19 |
| 3,963,835 | 6/1976 | Gryczka | 426/18 |
| 4,021,581 | 5/1977 | Sing | 426/61 |
| 4,140,800 | 2/1979 | Kline | 426/18 |
| 4,223,042 | 9/1980 | Sternberg | 426/19 |
| 4,238,512 | 12/1980 | Menge | 426/20 |
| 4,318,991 | 3/1982 | Hill | 435/245 |
| 4,393,084 | 7/1983 | Pomper | 426/19 |

OTHER PUBLICATIONS

"Yeast Fermentation—Effects of Temperature, pH, Ethanol, Sugars, Salt, and Osmotic Pressure", Elmer J. Cooper and Gerald Reed, The Bakers Digest, Dec. 1968, pp. 22–29 and 63.

"A Review of Fermentation", C. D. Magoffin and R. C. Hoseney, The Bakers Digest, Dec. 1974, pp. 22, 23, 26 and 27.

"pH In Baking", Baking Science and Technology, pp. 264–266.

*Primary Examiner*—R. B. Penland
*Assistant Examiner*—Marianne S. Minnick
*Attorney, Agent, or Firm*—Paul J. Juettner

[57] ABSTRACT

A fermentation aid for yeast-raised bakery goods comprising a fermented mixture of flour, sugar, water and a yeast of the species *Saccharomyces cereviseae* wherein the mixture is fermented for a period of time sufficient in the absence of other ingredients to decrease the pH of the mixture from the initial pH to a pH below about 4.75 and dried under conditions such that a major amount of the volatile components of the mixture with the exception of water remain in the fermented aid after drying.

24 Claims, No Drawings

FERMENTATION AID FOR CONVENTIONAL BAKED GOODS

BACKGROUND OF THE INVENTION

The present invention relates to fermentation aids for conventional *Saccharomyces cereviseae* yeast raised baked goods and particularly bread.

Fermentation, in the manufacture of bread, in addition to gas formation performs numerous important functions such as dough conditioning and flavor development. The gluten, tough and elastic after hydration, is developed or conditioned during the fermentation stage to make the dough soft and pliable. This is accomplished by enzymes and reducing agents in the yeast and also by the stretching of the gluten by the gas formed during fermentation. The correct amount of conditioning is important in making good bread. Underdeveloped gluten causes poor volume and texture, faster staling and reduced shelf life. Overdeveloped gluten becomes too weak for good bread characteristics. It is essential that the gluten form an optimally soft and elastic network to trap the gas developed during fermentation, and expand to optimum volume.

The development of flavor and aroma components is also a critical function of the fermentation. The development of these components is favored by long-term fermentations.

Traditional processes of bread making involve long fermentation times. One such process is the straight dough process. In this process, all the ingredients of the bread are added at the initial mixing stage, mixed into a dough and fermented for a relatively long period of time allowing for maximum acceptable dough conditioning and the proper development of flavors and aromas. A variation of this basic process is the "Sponge and Dough" process. In this process part of the flour, yeast, yeast food and part of the water are mixed initially into a dough-like sponge. This sponge is allowed to ferment for about 3 to about 4 hours (from about 82% to about 93% of the total fermentation time). The remainder of the dough ingredients is then added to the sponge to form a dough which is then allowed to ferment for about 20 to about 40 minutes (the balance of the total fermentation time). This process accounts for a large proportion of the bread prepared in the United States and gives a good quality loaf.

However, long fermentations are expensive as they are time and labor consuming, require large fermentation areas and also skilled supervisory personnel.

Numerous methods have been developed to shorten the fermentation time. Prominent amongst these short time methods are high yeast and high dough temperature methods; continuous mix methods, high speed mixing methods and variations and combinations of the above.

While the use of additional yeast and higher temperatures can speed up the fermentation, this is generally at the expense of flavor, aroma and texture since sufficient time has not been allowed for their development. Further, the use of high temperature and/or high yeast levels minimizes process tolerance limits.

Another process for preparing bread involves the complete elimination of fermentation. In this process called the continous dough process, all the ingredients are added into a high speed mixer known as a developer. Here the conditioning of the gluten which is normally carried out over an extended period of time is accomplished within a very short time by means of the input of work by high speed rotors. The result is the complete elimination of fermentation time, and the formation of a loaf of bread of good symetrical qualities when viewed from the outside. However, the characteristic flavor and aroma of fermented bread is absent and there is a difference in the bread texture which can be characterized as "short-eating" instead of the characteristic chewy bread mouth feel of conventional fermented bread.

In another process, termed liquid ferment breadmaking, fermentation is conducted in a liquid before enough flour to make a dough has been added. The fermentation broth contains water, yeast, sugar, enrichment nutrients and yeast food and optionally a portion of the flour. The liquid ferment, flour, shortening, additional sugar and an oxidizing agent are then pumped to a developer where rapidly rotating agitators develop the dough. The dough is then cut, shaped, proofed and baked. In this process, some of the fermentation flavors and aromas can be introduced into the bread as a result of the liquid ferment. However, some reservations have been expressed about the bread texture as developed by high speed mixing vis-a-vis dough fermentation.

The time for fermentation is especially acute in the preparation of sour dough. Sour dough relies upon the formation of lactic acid by a specific *lactobacillus, L. sanfrancisco*, and the fermenting of a special yeast, *T. holmii* to form a bread having the characteristic sour dough taste (U.S. Pat. No. 3,894,773). The original method of manufacturing sour dough was to innoculate a new dough with a piece of fermented dough which thus provided the lactobacillus and the yeast. Generally 8–12 hours of fermentation is needed to adequately develop the flavor.

Numerous patents exist which are directed to processes for reducing the fermentation time while providing the desirable sour dough flavor. In general, these patents relate to prefermenting a base with a *lactobacillus* to form lactic acid which, alone or in combination with *T. holmii*, is added directly to the dough. By these procedures, an initial start is given to the lactic bacteria thus reducing fermentation time. These preferments can be freeze dried to prevent destruction of bacteria or spray dried (kills the yeast).

Sour dough bread is well known in the industry as a bread having specific flavors and production problems. Sour dough bread is distinct from other breads which are raised with a yeast of the genus Saccharomyces, i.e. non-sour dough bread. None of the aforementioned references teaches a method for reduction in the fermentation time of conventional baked goods such as American white, natural or variety breads. While fermentation time in conventional baked goods can be reduced by such means as the use of excess yeast and higher temperature, the decrease in the fermentation time has been at the loss of dough conditioning and texture as well as the necessary flavor and aroma components needed for good results.

SUMMARY OF THE INVENTION

In accordance with the present invention, it has been found that conventional baked goods which rely on yeast of the species *Sacchoromyces cereviseae* for leavening can be prepared using a significantly reduced fermentation time without loss of the characteristic texture, flavor or aroma of a like baked product prepared using the full fermentation period. This can be accomplished by adding to the dough of the baked goods an amount of a fermentation aid effective to reduce the fermentation time comprising a dry ferment residue prepared by a process comprising fermenting a mixture comprising flour, sugar (optional but preferred), water and a yeast of the species *Saccharomyces cereviseae* for a period of time sufficient in the absence of other ingredients to decrease the initial pH below a pH of about 4.75 and drying the resultant product under conditions such that a major amount of the volatile components (with the exception of water) remain after drying.

By the use of this fermentation aid, the benefits of long term fermentation can be retained while allowing for the reduction in fermentation time. The product of the present invention can also be used to improve the flavor, aroma and conditioning of a bread.

DETAILED DESCRIPTION OF THE INVENTION

The fermentation aid of the invention is a dried ferment of flour, sugar (optional), water and a yeast of the species *Saccharomyces cereviseae*. The ferment can be made in the form of a dough or preferably, in the form of a slurry.

The flour utilized is wheat flour. The grade of flour depends on the end use and generally contains from about 9.5% protein for crackers to 16.5% for for whole wheat bread (see Kirk-Othmer, Encyclopedia of Chemical Technology 2nd Edition, Vol.2, pages 235 et seq.). The flour should not contain any chemicals detrimental to the fermentation reaction. Special flours such as rye can also be used, generally, in addition to the wheat flour.

While the flour contains sugar it does not contain enough to maintain a satisfactory rate of fermentation. Therefore, sugar in an amount ranging from 0% to about 10% and preferably from about 3% to about 8% based on the weight of the flour is used in the fermentation for a practical fermentation rate. The sugar can be any form of a mono or disaccharide which is fermentable by the yeast directly or after enzyme breakdown. The preferred sugar is sucrose.

The yeast of the species *Saccharomyces cereviseae* is also known as "baker's yeast". The yeast is preferably used as a compressed yeast though the dried form can also be used.

The fermentation mixture can also contain other ingredients commonly used in preparing bread ferments such as yeast foods, salt and antimicrobial agents. The antimicrobial agents include salt, acids such as acid whey, dilute vinegar (baker's vinegar), and the like. Propionates are preferably avoided since they have distinct flavor disadvantages even though they have little effect on yeast activity. If desired, pH adjusting agents (acids, alkalis, buffers and neutralizing agents) can also be added during the course of the fermentation to control or maintain the pH level.

The ratio of flour to water is variable. However, if the ratio of flour to water is too low (proportion of water too high), improper yeast proliferation can occur. It the ratio is too high, a product which can be easily processed and dried cannot be obtained. Preferably, the amount of water ranges from about 55 parts to about 250 parts by weight per 100 parts flour. As the amount of water increases from 55 parts to 250 parts, the fermenting mixtures goes from a dough to a viscous material to a slurry. For a dough ferment, the amount of water ranges from about 55 parts to about 75 parts by weight per 100 parts flour. For a slurry ferment, the amount of water ranges from about 120 parts to about 250 parts by weight per 100 parts flour. In between these two limits, the ferment ranges from a dough to a viscous material to a slurry. Preferably, the yeast is fermented in a slurry ferment preferably using a water content ranging from about 160 parts to about 200 parts water. Since it is not required that the dough be baked, the amounts of water used are not required to be such that an acceptable baked product can be produced.

The yeast is used in an amount sufficient to provide the necessary cell population such that the fermentation can be developed within a reasonable time period. The amount of yeast used (based on compressed yeast) can range from about 1.5% to about 10% (add on%), preferably from about 2% to about 6% and more preferably from about 2.5% to about 3.5% based on the weight of the flour in the slurry. The cell count can range from about $30 \times 10^7$ to about $220 \times 10^7$, preferably from about $40 \times 10^7$ to about $135 \times 10^7$ and more preferably from about $55 \times 10^7$ to about $80 \times 10^7$ cells per gram of flour. The use of larger cell populations can decrease the time needed for fermentation. An extensive reduction in the fermentation time by the use of large quantities of yeast cells may be undersirable from the standpoint of developing the desired flavor and aroma components.

Salt is an optional ingredient which can be added in an amount sufficient to stabilize the fermentation rate while hindering any preferential growth of bacteria. The salt is preferably used in an amount ranging from about 0.5 to about 3 parts per 100 parts flour.

A portion of dough or slurry, either fresh or dried from a previous ferment can be added as an ingredient of a new ferment. Generally an amount ranging from about 5% to about 20% on a dry add on basis based on the flour in the new ferment can be used. This is generally added along with the initial ingredients to the ferment.

The type of ferment can be dictated by the drying method used. A dough with its low moisture content can be effectively freeze dried. A larger amount of water is required for spray drying. For this purpose a slurry having an amount of water ranging from about 120 parts to about 250 parts per 100 parts flour can be used. This slurry for spray drying can be made by slurrying the dough to a proper water level after fermentation or fermenting the flour in an appropriate slurry. It is preferred to effect fermentation in a slurry, preferably having an amount of water relative to flour as given above.

The fermentation is conducted in accordance with good manufacturing techniques. The ingredients can be easily slurried in any order in water, the flour preferably first, in a covered vessel equipped with an agitator. The yeast can be added as a slurry in an amount of water sufficient to allow for even distribution of the yeast throughout the slurry, i.e. from about 5 parts to about 10 parts water per 1 part yeast. Any other ingredients such as salt can then be added. The starting pH which can range as high as about pH 6.0 and as low as about pH 5.0 can then be adjusted if necessary. For effective fermentation it is preferred that the starting or initial pH be within the range of from about pH 5.7 to about pH 5.1. pH adjustments can be made with food grade acids or alkalis if necessary. The fermentation can then be conducted under slight agitation to keep the ingredients admixed.

Fermentation is carried out at a temperature most effective for the species of yeast used. In general temperatures ranging from about 20° C. to about 30° C. should be used.

The fermentation time varies depending on the quantity of aroma and taste components desired as well as the amount of yeast and temperature used a minimum being about 8 hours (0.33 days). Since the development of flavor and aroma is flavored by long fermentation time, it is desirable to allow the fermentation to proceed for a minimum of 12 hours. The maximum being dictated by the growth conditions of the ferment. In practice, the fermentation time can range from about 12 hours to about 72 hours (3 days) and preferably from about 18 hours to about 48 hours.

The fermentation is generally conducted until the pH of the ferment is below 4.75 and preferably within the range of from about 4.75 to about 4.25. The initial and final pH ranges are based on a composition of flour, yeast, sugar (3 to 8%) and water within the amount limits states hereinbefore. Compositions prepared using additional ingredients which are characterized by pH's outside the stated ranges in the presence of the additional ingredients but within the stated range when using only the flour, sugar, yeast and water are considered within the invention.

After fermentation has been conducted to the desired point, the product is dried under conditions such that an amount of volatile components sufficient to improve the flavor, aroma and texture of the final product remain in the dried fermentation aid. These volatile components are responsible not only for flavors and aromas but also for improved dough conditioning. Further, enzymes are inactivated by excessive heating conditions and for this reason such conditions should be avoided. Preferably, the heating conditions are such that at least a major amount of the volatiles except water remain after drying. Freeze drying can be effectively used as well as spray drying. The preferred method of drying is spray drying using any standard nozzle or centrifugal atomizer. The drying temperatures can be such that few viable yeast cells remain after drying. As drying temperatures decrease the content of viable microorganisms increases. The use of spray drying temperatures within the range of from about 55° C. to about 150° C. are preferred. By drying is meant reduction in the moisture content such that a powder dry to the touch is formed having a moisture content of from about 4.5% to about 9.0%.

The present invention can be used to decrease the fermentation time without a corresponding loss of standard bread characteristics including flavor, aroma or texture in a wide variety of conventional yeast raised breads (non-sour dough). These include American white, rye, bran, pumpernickel, sweet doughs including yeast raised donuts and the like. The bread goods can be in the form of loaves, rolls, hamburger or hot dog rolls, club rolls, pizza, or any other yeast-raised non-sour dough bread. The ingredients of these breads are standard and well known to a skilled artisan. The fermentation aid can also be used to shorten the fermentation time of non-bread fermented bakery items such as crackers, pretzels and the like.

The fermentation aid of the invention can be added at any point in the process of manufacturing the baked good but preferably the aid is added at the time when the major amount of the fermentation is accomplished so as to have a maximum or optimum effect on rate of fermentation. In straight dough, the fermentation aid is generally added along with the initial ingredients. In the sponge and dough method, the fermentation aid is added with the sponge ingredients. The aid can also be added to the dough stage either as the sole quantity or as an additional amount over that added to the sponge. When used as the sole amount, flavor development may be expected. In either case, the fermentation rate of the dough can be adjusted if necessary to prevent overfermentation. In continuous doughs, addition of the fermentation aid to the preferment is expected to provide the results of the invention.

The fermentation aid is generally used at temperatures and under conventional fermentation conditions except time. Fermentation temperatures ranging from about 78° C. to about 88° C. are preferred for effective results. Temperatures below 74° C. are too cold for fermentation and are preferably not used.

The fermentation aid has also been found to posses water absorption characteristics. Because of this fact, the product of the invention can be used to replace some or all of the milk or milk replacer presently used in bread. Since commercial bread in general is made with milk replacers, the substitution of the fermentation aid of the invention for the milk replacer should cause no reformulation problems.

The milk or milk replacer in straight dough is part of the original ingredients allowing for a direct substitution. In the sponge and dough method, the fermentation aid is added to the sponge but the milk or milk replacer is generally in the dough and is deleted therefrom. In the continuous bread making process, the milk is completely or partially in the dough and would be deleted therefrom.

The fermentation aid can be sold as is to large institutions such as commercial bakeries. Home bakers can obtain the product as is or admixed with various other bread ingredients. The fermentation aid can also be included in frozen bread or pizza dough.

The fermentation aid is used in an amount sufficient to provide the desired reduction in fermentation time. The amount can range from about 2% to about 10% (add on) based on the weight of the flour. The capability of the fermentation aid to reduce fermentation time is directly related to the extent of fermentation time used in preparing the fermentation aid. Further, the amount of fermentation aid used is directly related to obtaining the desired reduction in fermentation in the baked goods without substantial loss of fermentation advantages. For instance, it has been found that fermentation aid fermented 24 hours can be used at a 3% level to reduce fermentation time about 1 hour, and approximately 6% for a 2 hour reduction in a white bread which was normally fermented 4 hours in the sponge. A similar fermentation aid fermented 12 hours requires 4% to reduce the fermentation 1 hour and 8% to reduce the same 2 hours. A fermentation aid fermented 72 hours can be expected to reduce the fermentation time by a greater amount at a comparable level without substantial loss of fermentation advantages. Lesser amounts can be used if losses in fermentation advantages are desired. As the extent of fermentation used to prepare the fermentation aid is increased, the amount needed to provide the same level of fermentation time reduction decreases and vice versa.

The amount of fermentation aid used also depends on the nature of the bread and the effects of fermentation desired. The above figures which relate to white bread can be easily adapted to any *Saccharomyces cereviseae* yeast raised baked good by a skilled artisan.

The use of the fermentation aid as a replacement of the milk replacer or milk is not limited to a weight for weight replacement basis. In general, the amount of milk replacer used ranges from about 2% to about 4% based on the flour. In general, the milk or milk replacer can be replaced by the fermentation aid in a ratio of 1:2 and greater. For instance, the use of 3% based on the flour of a fermentation aid fermented 24 hours to reduce the fermentation time 1 hour can also replace the 2% to 4% milk or milk replacer.

The fermentation aid in reducing fermentation time can also reduce in some cases the sugar requirement in the bread. Sugar requirements normally ranging from about 6% to about 12% for bread can be decreased to a range of from about 1% to about 3% (the percentage varying by weight based on the weight of the flour) depending on the amount of sugar in the formulation.

The fermentation aid can be sold as is in its dry form or admixed with various other ingredients such as those normally used in making bread including yeast; yeast food; oxidants such as bromates, iodates or ascorbic acid; reducing agents such as sodium bisulfite; enzymes such as proteolytic and amylolytic enzymes; surfactants such as sodium or calcium stearoyl-2-lactylate; flavors such as sour flavors from yogurt (preferably dry), cultured dairy products, acid whey, lactic acid and the like; antimicrobial agents such as salt, acid whey, vinegar (baker's), propionates and the like; color, dough conditioners such as calcium peroxide, and soy flour; sugar, dextrose and corn syrup; and milk replacers and milk solids.

The cost of using the fermentation aids of the invention can be significantly reduced in certain bread formulations by replacing numerous ingredients in the bread formulation, such as milk or milk replacer, part of the sugar, dough conditioners and possibly part of the yeast food with the fermentation aid. The exact cost savings will depend on the cost of the respective ingredients and amounts replaced. By this means a portion of the cost of using the fermentation aid can be beneficially derived from the cost of the ingredients replaced.

It has also been found that the use of the fermentation aid of the invention in combination with an oxidizing agent can be used to further reduce fermentation time, e.g. to levels of maximum fermentation of from 15 to 30 minutes. Oxidizing agents for dough conditioning such as bromates and iodates can be used though ascorbic acid is preferred. Since the oxidation potential varies, an amount of the oxidant in the range of from about 5 to about 100 parts per million parts of flour in the bread can be used depending on the oxidation potential and the fermentation conditions used in preparing the bread. Ascorbic acid is preferred as it is difficult to overtreat the dough vis-a-vis iodate which can easily overtreat. The ascorbic acid is used in an amount ranging from about 50 to about 100 parts per million of flour. A preferred composition contains from about 60 to about 90 parts ascorbic acid per million parts flour.

On the basis of fermentation aid and oxidizing agent, the fermentation aid comprises from about 99.98% to about 99.67% fermentation aid from about 0.02% to about 0.33% oxidizing agent and preferably from about 0.17% to about 0.33% for the preferred ascorbic acid.

The basic formulation of fermentation aid and ascorbic acid can be further modified by inclusion therewith of other ingredients such as those normally used in bread. Such additional ingredients include enzymes such as proteolyase, amylase, MSG, L. cystein, sodium metabisulfite and the like.

The invention will be illustrated in the Examples which follow:

EXAMPLES 1-2

A fermentation aid was prepared from the following formulation (based on 100 parts flour):
Flour: 100 parts (by weight)
Sugar: 8 parts
Water: 160 parts
Fresh Yeast: 2.75 parts
Salt: 0.5 parts
Acid Whey (dry): 3.0 parts 2.5 kilograms fresh yeast were slurried in 1.5 liters of the water. After steaming for 15 minutes, 144 liters of water at 26.7° C. was charged into a heated fermentation vessel equipped with an agitator. 91 kilograms flour, 7.3 kilograms sugar and 2.7 kilograms acid whey were added to the vessel. The slurried yeast was added simultaneously with the dry ingredients. 0.45 kilograms of salt were added and the composition was mixed well. The broth temperature was maintained at 27.8° C.±2.2. The broth was fermented for 24 hours (Example 1). The product was then spray dried using an air outlet temperature of 87.8° C.

A like fermentation was also conducted using 2.73 kilograms fresh yeast instead of 2.5 kilograms, and 182 liters of total water instead of 145.4 liters and a fermentation time of 12 hours (Example 2).

EXAMPLE 3

A spray dried fermentation aid was prepared by fermenting small batches using the formulation of Example 1 with the exception that the salt was 0.75 parts.

The yeast was slurried in 25 parts water. The dry ingredients, with the exception of the salt, were added to the bowl of a planetary mixer along with the water. The slurried yeast was then added and then the salt. After mixing well, the temperature of the broth was adjusted to 26.7° C. and fermented for 72 hours. The products from various runs were combined and spray dried.

EXAMPLE 4

(Preferred Embodiment)

A fermentation aid was prepared using a small amount of a previous fermentation aid as starter using the following formulation (based on 100 parts flour):
Flour: 100 parts, 90.9 kilograms
Water: 200 parts, 181.8 liters
Sugar: 8 parts, 7.3 kilograms
Fresh Yeast: 3 parts, 2.7 kilograms
Salt: 0.75 parts, 0.68 kilograms
Vinegar (baker's): 1 part, 0.91 kilograms
Product of Example 1: 10 parts, 9.1 kilograms The ingredients were charged as in Example 1 with the exception that the vinegar was added to the vessel during addition of the yeast slurry, and the dry product of Example 1 was added after the salt addition. The fermentation proceeded for 24 hours at about 26.6° C. and spray dried as in Example 1.

EXAMPLE 5

A fermentation aid was prepared in accordance with the procedure of Example 4 except that the 3 parts fresh yeast was replaced with 1.5 parts dried yeast, the previously prepared fermentation aid was added with the dry ingredients, the vinegar was added after the addition of the dry powders followed by the addition of the yeast slurried in 1 liter of water.

EXAMPLE 6

To determine the effect of drying temperature on the effectiveness of the fermentation aid, Example 4 was duplicated with the exception that the vinegar was added after powder addition and the yeast was slurried in water at a ratio of 2.7 kilograms yeast to 1 liter of water.

The ferments were spray dried under three conditions:

(a) 87.8° C. outlet temperature, $24.1 \times 10^6$ pascals inlet pressure (Example 13);

(b) 71.1° C. outlet pressure, $20.7 \times 10^6$ pascals inlet pressure (Example 14);

(c) 54.4° C. outlet pressure, $20.7 \times 10^6$ pascals inlet pressure (Example 15).

Dried product was only collected after reaching a steady state at a particular air outlet temperature. 9 to 14 kilograms of dried product was collected at each temperature. All three products provided acceptable bread even though a reduced fermentation time was used.

EXAMPLE 7

The products of Examples 1, 2 and 4 were evaluated in various bread formulations as follows:

| | White Bread - Sponge and Dough | | | |
|---|---|---|---|---|
| | White Bread Formula 1 | | White Bread Formula 2 | |
| Ingredient | Sponge Grams | Dough Grams | Sponge Grams | Dough Grams |
| Flour | 420 | 280 | 455 | 245 |
| Water | 250 c.c. | 190 c.c. | 270 | 190 |
| Fresh Yeast | 17.5 | — | 15 | — |
| Yeast Food | 3.5 | — | 3.94 | — |
| Proteolytic Enzyme | 3.5 | — | 5.25 | — |
| Sugar | — | 56 | — | 15.5[1] |
| Corn Syrup | — | — | — | 47 |
| Lard | — | — | — | — |
| Shortening | — | 21 | 9.6 | 17.9 |
| Emulsifier | — | 3.5[2] | — | 7 |
| Salt | — | 17.5 | — | 14.9 |
| Milk/Milk Replacer | — | 21 | — | 21 (MR) |
| Fermentation Aid | (21) | — | (21) | — |
| W-52[3] | — | — | — | 2.6 |
| Wytase[4] | — | — | — | 6.56 |
| Bread Mate[5] | — | — | — | 3.5 |
| Sodium Propionate | — | 1.47 | — | — |

[1]High Fructose Corn Syrup Solids
[2]Atmul 500 Emulsifier/Surfactant
[3]Dough Conditioner Containing Calcium Peroxide
[4]Dough Conditioner Containing Soy Flour
[5]Cultured Wheat Flour Procedure for preparing white bread (formulation 1):

Sponge:

All dry ingredients were admixed and then admixed with bakers yeast slurried in water. The mixture was blended in planetary mixer (Hobart) for 1 minute at low speed and 3 minutes at medium speed. The sponge was placed in a bowl and put in a fermentation cabinet for 4 hours at 26.7° C., the relative humidity of the cabinet being sufficient to prevent skinning.

Dough:

After fermentation of the sponge, all dry ingredients except the salt, propionate, shortening and emulsifier were admixed. The water was then added along with the sponge. These ingredients were mixed in a planetary mixer for 1 minute at low speed. The shortening and emulsifier were then added followed by further mixing for 2 minutes at medium speed. The salt and propionate were then added and mixing continued for an additional 10 minutes at medium speed. The final dough temperature was about 28° C.

The dough was held 20–30 minutes in the fermentation cabinet, and 540 grams of the dough was scaled out, rounded and held for 10 minutes for intermediate proof. The dough was rolled, molded, placed in a pan and proofed to standard height (about 60–70 minutes) in final proof box at about 43° C. and 80% relative humidity. The bread was baked at 218° C. for 22 minutes.

When testing a fermentation aid the aid was added in the sponge stage generally in the same amount as the milk or milk replacer. The milk or milk replacer was deleted from the dough side. An additional amount of water (10 c.c. for 3% fermentation aid) is added to offset the increased water absorption capabilities of the fermentation aid.

Procedure for preparing white bread (formulation 2):

All the ingredients of the sponge were combined and mixed for 4 minutes. The sponge was fermented for 3 hours at 25.5° C. The dough ingredients were mixed for 2 minutes at slow speed and 10 minutes at high speed in a planetary-type mixer. The dough was fermented for 3½ hours. The dough temperature was 25.7° C. The bread was baked as in formulation 1.

In evaluating samples of the invention, the milk replacer was omitted from the dough ingredients and a like amount of fermentation aid was added to the sponge ingredients.

The results are shown in Table 1 as follows:

TABLE 1

| | Fermentation Time Hours | Proof Time Min. | Bread Sp. Vol. | Crumb pH |
|---|---|---|---|---|
| White Bread Formulation 1: | | | | |
| Product of Example 1 3% | 3 | 66 | 5.46 | 5.39 |
| Product of Example 2 3% | 3 | 67 | 5.33 | 5.39 |
| Control (Milk Replacer) 3% | 4 | 70 | 5.29 | 5.42 |
| Product of Example 1 3% | 3 | 68 | 5.7 | 5.38 |
| Product of Example 4 3% | 3 | 67 | 5.8 | 5.37 |
| Control (Milk Replacer) 3% | 4.5 | 70 | 5.1 | 5.42 |
| White Bread Formulation 2: | | | | |
| Product of Example 4 3% | 2½ | 60 | 4.90 | 5.32 |
| Control (Milk Replacer) 2.06% | 3½ | 60 | 4.82 | 5.34 |

EXAMPLE 8

The product of Example 1 was also evaluated in a sponge and dough American rye bread of the following formulation:

| Ingredients | Sponge | Dough |
|---|---|---|
| Flour (patent) | 64.75 | 35.25 |
| White Rye Flour | 27.87 | 14.75 |

-continued

| Ingredients | Sponge | Dough |
|---|---|---|
| Water | 43.10 | 20.11 |
| Yeast | 2.3 | .43 |
| Yeast Food | .43 | — |
| Vital Wheat Gluten | 2.87 | — |
| Calcium Stearoyl-2-Lactylate | .47 | — |
| Salt | | 2.59 |
| Shortening | | 2.3 |
| Ground Carraway | | 2.3 |
| Liquid Sugar | | 11.49 |
| Calcium Propionate | | .107 |
| Rye Flour | | 1.15 |
| Caramel Color | | .72 |
| Bromate Tablets | | 3 |

In testing the product of Example 1, 3% of the product of Example 1 was added and 3% of the wheat flour was deleted from the sponge in sample 1 and in sample 2, 3% of the rye flour was deleted from the sponge instead of the 3% wheat flour.

Sponge:
Mix Time: 2 minutes at low speed (planetary mixer) 2 minutes at high speed.
Temperature: 24.4° C.
Fermentation Time: 4½ hours (4 hours sponge and ½ hour dough).
Proof Time: 55–60 minutes.
Dough:
Mix Time: 4 minutes at low speed (planetary mixer) 4½ minutes at high speed.
Temperature: 25.5° C.
Floor Time: 25 minutes.
Scale 620 grams per loaf.
Proof to standard height.
Bake for 25 minutes at about 218° C.
The following results were obtained:

TABLE 2

| | Fermentation Time, hours | Proof Time min. | Specific Volume | Crumb pH |
|---|---|---|---|---|
| Sample 1 (3% Wheat Flour replaced with 3% Fermentation Aid) | 3¾ | 69 | 3.99 | 5.29 |
| Sample 2 (3% Rye Flour replaced with 3% Fermentation Aid) | 3¾ | 69 | 3.98 | 5.26 |
| Sample 3 - Control | 5 | 68 | 3.80 | 5.24 |

EXAMPLE 9

The product of Example 3 was used as a fermentation aid in preparing white bread from the following formulation:

| Ingredients | Sponge (grams) | Dough (grams) |
|---|---|---|
| Flour | 380 | 320 |
| Water | 215 | 185 |
| Compressed Yeast (baker's) | 15 | — |
| Yeast Food | 2.8 | — |
| Sodium Stearoyl-2-Lactylate | 1.61 | — |
| Salt | — | 11.5 |
| High Fructose Corn Syrup Solids | — | 133 |

-continued

| Ingredients | Sponge (grams) | Dough (grams) |
|---|---|---|
| Shortening | — | 16. |
| Spec 70 [6] | — | 2.38 |
| Wytase [4] | — | 3.6 |
| Calcium Propionate | — | 0.75 |
| Milk Replacer | — | 21 |

[4] Dough Conditioner Containing Soy Flour
[6] Dough Conditioner Containing Calcium Peroxide The bread was prepared according to the method for white bread Formulation 1.

The staling of the bread was evaluated using a compressimeter using AACC method 74-10, the units being reported in grams of actual force needed to penetrate a 2.5 millimeter slice of bread.

The following results were obtained:

TABLE 3

| | 3% Prod. Ex. 3 | 3% Milk Replacer |
|---|---|---|
| Sponge Fermentation Time (hours) | 3 | 4 |
| Dough Fermentation Time (hours) | ½ | ½ |
| Proof Time (minutes) | 70 | 77 |
| Average Loaf Wt. (grams) | 484 | 489 |
| Average Loaf Vol. (c.c.) | 2725 | 2475 |
| Average Specific Vol. | 5.63 | 5.06 |
| Crumb pH | 5.17 | 5.31 |
| Softness (10 day) | 105 | 129 |

EXAMPLE 10

White bread was prepared according to formulations 1 and 2 in Example 7 using 3% of the fermentation aid of Example 4 and reduced fermentation time. This bread was compared to controls using 3% milk replacer and standard fermentation time as well as reduced fermentation times. The following results were obtained:

TABLE 4

| | Product Example 4 | Milk Replacer | |
|---|---|---|---|
| | Bread Formulation 1 | | |
| Sponge Time (hours) | 2½ | 4 | 2½ |
| Dough Time (hours) | ½ | ½ | ½ |
| Proof Time (minutes) | 67 | 70 | 72 |
| Av. Loaf Weight (grams) | 466.5 | 468.9 | 474.1 |
| Av. Loaf Vol. (c.c.) | 2713 | 2388 | 2425 |
| Av. Specific Vol. | 5.82 | 5.09 | 5.12 |
| Crumb pH | 5.37 | 5.42 | 5.49 |
| Softness (11 days) | 20.33 | 21.0 | 24.67 |
| | Bread Formulation 2 | | |
| Sponge Time (hours) | 3 | 4 | 3 |
| Dough Time (hours) | ½ | ½ | ½ |
| Proof Time (minutes) | 60 | 60 | 60 |
| Av. Loaf Weight (grams) | 474 | 469.5 | 481.5 |
| Av. Loaf Vol. (c.c.) | 2325 | 2263 | 2263 |
| Av. Specific Vol. | 4.91 | 4.82 | 4.70 |
| Crumb pH | 5.32 | 5.34 | 5.47 |
| Softness (5 days) | 12.50 | 12.17 | 13.67 |

EXAMPLE 11

Gas pressuremeter tests were conducted to ascertain comparative gassing ability of the fermentation aid in assisting in gas production in a fermenting dough. A pressuremeter test according to AACC 22.11 was conducted with the exception that in the control 0.3 grams non-fat dried milk were added and in testing the fermentation aids of the invention the 0.3 grams NFDM were replaced with 0.3 grams fermentation aid. A dough was placed in a sealed jar with a pressure gauge and the pressure readings were an indication of the gas produced. The results are reported in Table 5 below:

TABLE 5

| | |
|---|---|
| 1. | Sample with 0.3 grams of Product of Example 4 |
| 2. | Sample with 0.3 grams of Product of Example 1 |
| 3. | Sample with 0.3 grams of Product of Example 2 |
| 4. | Sample with 0.6 grams of Product of Example 4 |
| 5. | Control with 0.3 grams of NFDM |

| | 60 Mins | 90 Mins | 120 Mins | 150 Mins | 180 Mins | 210 Mins | 240 Mins | 270 Mins | 300 Mins |
|---|---|---|---|---|---|---|---|---|---|
| 1. | 105 | 160 | 240 | 325 | 405 | 490 | 530 | 560 | 585 |
| 2. | 100 | 160 | 235 | 325 | 405 | 480 | 530 | 560 | 585 |
| 3. | 95 | 155 | 230 | 320 | 400 | 480 | 530 | 560 | 585 |
| 4. | 105 | 165 | 250 | 330 | 415 | 490 | 535 | 570 | 595 |
| 5. | 95 | 155 | 230 | 310 | 390 | 455 | 485 | 510 | 520 |

The results show that all three fermentation aids have roughly the same or better gassing ability than the control.

When the fermentation aid was doubled, the gassing ability increased but not substantially.

EXAMPLE 12

A chromotographic analysis was run on the product of Example 1 with the following results:

TABLE 6

| | Product of Example 1 Fermentation Aid | Control Flour |
|---|---|---|
| Sucrose - Maltose | 1.5 | 2.3 |
| Glucose | 0.1 | 0.2 |
| Fructose | 0.2 | 0.5 |
| Lactic Acid | 5.15 | <0.04 |
| Acetic Acid | Trace | — |
| Ethanol | 1.0 | Trace |

These are rough estimates of approximately weight percentages.

In addition to the peaks identified above, two unidentified peaks were also present.

Analytical tests were run on a number of fermentation aids as follows:

TABLE 7

| Sample Product of Example | Moisture | Fat | Protein | Fiber | Ash | CH |
|---|---|---|---|---|---|---|
| 1 | 5.7% | 0.08% | 17.99% | 0.30% | 1.59% | 74.68% |
| 4 | 4.9% | 0.14% | 18.66% | 0.25% | 1.54% | 74.78% |
| 6(a) | 5.06% | 0.20% | 18.66% | 0.29% | 1.51% | 74.57% |
| 6(b) | 6.98% | 0.14% | 17.22% | 0.27% | 1.49% | 74.17% |
| 6(c) | 8.90% | 0.14% | 16.45% | 0.20% | 1.48% | 73.13% |

Microbiological analysis on the fermentation aids were conducted with the following results:

TABLE 8

| Sample Product of Example | Yeast Count | Mold Count | Standard Plate Count | Coliform |
|---|---|---|---|---|
| 1 | 80 col/g | <10 col/g | 1600 col/g | <3 col/g |
| 4 | <10 col/g | <10 col/g | 49000 col/g | <3 col/g |
| 6(a) | 50 col/g | <10 col/g | 68000 col/g | <3 col/g |
| 6(b) | 21000 col/g | <10 col/g | 230000 col/g | <3 col/g |
| 6(c) | 1160000 col/g | <10 col/g | 1570000 col/g | <3 col/g |

EXAMPLE 13

A series of loaves were prepared on a plant scale using the white bread formulation 2. 3.5% of the fermentation aid of Example 11 was added to the sponge and the milk replacer deleted from the dough. Three parts water was added to both the sponge and dough ingredients (total 6 grams). After fermenting for 2.5 hours vis-a-vis 3.5 for the control, the dough using the fermentation aid was tighter due to lack of available water and a colder proofing temperature (24.4 vs 26.7 for the control). The loaves prepared with the fermentation aid were slightly smaller in volume than the control but were otherwise acceptable.

An increase in 10 parts water and about 0.5°–1° C. in proofing temperature is expected to increase the volume to that of the control.

The staling of the bread was evaluated using a compressimeter. Representative results are reported in Table 8 and show no difference in firming rates due to the decrease in fermentation time.

TABLE 9

| Compressimeter | Fermentation Time Hours | Softness 4 Days | Softness 11 Days |
|---|---|---|---|
| 1. Product of Example 1, 3% | 3 | 12.75 | 21.50 |
| 2. Product of Example 5, 3% | 3 | 11 | 20.33 |
| 3. Control Milk Replacer, 3% | 4½ | 12 | 21 |

Triangular taste tests were also run using pieces of bread prepared using white bread formula 1 and 3% fermentation aid of Example 4 compared to a control of the same formulation which was fully fermented. After 3 days only 3 out of the 10 panelists were able to pick the odd sample and after 10 days only 2 out of the 10 were able to judge correctly. This indicated that there was no noticeable difference between a fully fermented loaf and a loaf with one hour less fermentation using the fermentation aid.

EXAMPLE 14

A white bread was prepared as in Example 9 using 21 grams (3% on a flour basis) of the fermentation aid of Example 4 in the sponge (deleting 21 grams of milk replacer from the dough) and 85 parts ascorbic acid per million parts flour.

The following results were obtained.

TABLE 10

| | Fermentation Time, hours | Proof Time min. | Specific Volume | Crumb pH |
|---|---|---|---|---|
| 3% Product of Example 4 + 85 ppm Ascorbic Acid | 2 | 70 | 4.82 | 5.29 |
| Control | 4½ | 70 | 4.82 | 5.24 |

What is claimed is:

1. A method for preparing a fermentation aid for yeast-raised bakery goods containing volatile flavor and aroma components comprising: fermenting a mixture of flour, sugar in an amount ranging from 0 to about 10% by weight based on the weight of the flour, from about 55 to about 250 parts water per 100 parts flour and a yeast of the species *Saccharomyces cereviseae* in an amount sufficient and for a minimum of 12 hours, said period of time being sufficient to decrease the pH of the mixture to a pH below 4.75: and drying the fermented mixture to a moisture content of from about 4.5% to about 9.0% under conditions such that a major amount of the volatile components of the mixture with the exception of water remain in the fermentation aid product after drying.

2. The method as recited in claim 1 wherein said sugar is used in an amount ranging from about 3 parts to about 8 parts by weight per 100 parts flour.

3. The method as recited in claim 1 wherein said yeast is used in an amount sufficient to provide an initial cell population ranging from about $30 \times 10^7$ to about $220 \times 10^7$ cells per gram of flour.

4. The method as recited in claim 1 wherein the pH prior to being decreased ranges from about 5.1 to about 5.7.

5. The method as recited in claim 1 wherein the drying is conducted in a spray drier.

6. The method as recited in claim 1 wherein the fermentation is conducted from about 12 hours to about 3 days.

7. The method as recited in claim 1 wherein the fermentation is conducted from about 18 to about 48 hours.

8. A method for preparing a fermentation aid volatile flavor and aroma components which comprises fermenting for a period of time ranging from about 12 hours to about 3 days a fermentable mixture comprising flour, from about 3 parts to about 8 parts sugar, from about 55 parts to about 250 parts water, said parts being per 100 parts flour and a yeast of the species Saccharomyces cereviseae wherein the initial yeast population ranges from about $30 \times 10^7$ to about $220 \times 10^7$ cells per gram of flour, the pH of the mixture decreasing from an initial pH ranging from about 5.1 to about 5.7 to a pH within the range of from about 4.75 to about 4.25; adjusting the water content such that the amount of water of the ferment ranges from about 140 parts to about 250 parts per 100 parts flour; and spray drying the mixture to a moisture content ranging from about 4.5% to about 9.0% under such conditions that at least 75% of the volatile components except water remain in the product after drying.

9. The method as recited in claim 8 wherein the fermentation is conducted from about 18 to about 48 hours.

10. The method as recited in claim 8 wherein the water content of said fermentable mixture before fermentation ranges from about 140 parts to about 250 parts per 100 parts of flour.

11. The fermentation aid product of claims 1 or 10.

12. In a method for preparing a yeast raised dough by fermenting flour, sugar, and water with a yeast of the species Saccharomyces cereviseae, the improvement which comprises adding to the dough from about 2 parts to about 10 parts per 100 parts flour of the fermentation aid as claimed in claims 1 or 8.

13. The method as recited in claim 12 wherein the fermentation aid is added along with the initial ingredients of the bread.

14. The method as recited in claim 12 wherein said dough is bread dough.

15. "The product produced by the method of claim 14.

16. The method as recited in claim 12 which includes the further step of baking the fermented dough.

17. A fermentation aid for yeast-raised bakery good comprising a fermentation aid produced by the method of claims 1 or 10 in combination with an amount of an oxidizing agent effective to condition the dough of said bakery good.

18. The product of claim 17 wherein the oxidizing agent is ascorbic acid.

19. The product of claim 17 wherein said oxidizing agent is present in an amount ranging from about 0.02% to about 0.33% based on the total combined weight of said fermentation aid and said oxidizing agent.

20. The product of claim 19 wherein the oxidizing agent is ascorbic acid and is present in an amount ranging from about 0.17% to about 0.33%.

21. In a method for preparing a yeast raised dough by fermenting flour, sugar, and water with a yeast of the species Saccharomyces cereviseae, the improvement which comprises adding to the dough from about 2 parts to about 10 parts per 100 parts flour of the fermentation aid as claimed in claim 17.

22. The method of claim 21 wherein the oxidizing agent is ascorbic acid.

23. The method of claim 21 wherein said oxidizing agent is present in an amount ranging from about 0.02% to about 0.33% based on the total combined weight of said fermentation aid and said oxidizing agent.

24. The method of claim 23 wherein the oxidizing agent is ascorbic acid and is present in an amount ranging from about 0.17% to about 0.33%.

* * * * *

UNITED STATES PATENT AND TRADEMARK OFFICE
CERTIFICATE OF CORRECTION

PATENT NO. : 4,500,548

DATED : February 19, 1985

INVENTOR(S) : Roy F. Silva

It is certified that error appears in the above—identified patent and that said Letters Patent is hereby corrected as shown below:

Col. 1, line 65, "continous" should be "continuous";

Col. 3, line 28, "for for" should be "for";

Col. 3, line 62, "It" should be "If";

Col. 5, line 9, "flavored" should be "favored";

Col. 5, line 21, "states" should be "stated";

Col. 5, line 45, "150°C" should be 105°C";

Col. 6, line 11, "preferment" should be "pre-ferment";

Col. 6, line 19, "posses" should be "possess";

Col. 8, line 25, "2.2" should be "2.2°";

Col. 13, line 35, "approximately" should be "approximate";

Col. 14, line 66 (Claim 1), "4.75:" should be "4.75;".

Signed and Sealed this

Sixth Day of August 1985

[SEAL]

Attest:

DONALD J. QUIGG

Attesting Officer   Acting Commissioner of Patents and Trademarks